(12) United States Patent
Kaneko et al.

(10) Patent No.: US 11,443,877 B2
(45) Date of Patent: Sep. 13, 2022

(54) STRAIN SENSOR RESISTOR

(71) Applicant: KOA CORPORATION, Ina (JP)

(72) Inventors: Homare Kaneko, Ina (JP); Natsumi Shiobara, Ina (JP); Yasushi Hiroshima, Ina (JP)

(73) Assignee: KOA Corporation, Nagano (JP)

( * ) Notice: Subject to any disclaimer, the term of this patent is extended or adjusted under 35 U.S.C. 154(b) by 0 days.

(21) Appl. No.: 17/278,130

(22) PCT Filed: Sep. 17, 2019

(86) PCT No.: PCT/JP2019/036290
§ 371 (c)(1),
(2) Date: Mar. 19, 2021

(87) PCT Pub. No.: WO2020/059681
PCT Pub. Date: Mar. 26, 2020

(65) Prior Publication Data
US 2021/0335524 A1    Oct. 28, 2021

(30) Foreign Application Priority Data
Sep. 21, 2018    (JP) .............................. JP2018-178084

(51) Int. Cl.
*H01C 10/10*    (2006.01)
*G01B 7/16*    (2006.01)
*H01C 1/14*    (2006.01)
(52) U.S. Cl.
CPC ............. *H01C 10/10* (2013.01); *G01B 7/18* (2013.01); *H01C 1/14* (2013.01)

(58) Field of Classification Search
CPC ............. H01C 10/10; H01C 1/14; G01B 7/18
See application file for complete search history.

(56) References Cited

U.S. PATENT DOCUMENTS 2,953,764 A * 9/1960 Tellkamp ............... H01C 17/23
338/309
3,134,953 A * 5/1964 Eisler ..................... H01C 13/02
338/2

(Continued)

FOREIGN PATENT DOCUMENTS

JP    H07-270109 A    10/1995
JP    2001-236175 A    8/2001

(Continued)

*Primary Examiner* — Kyung S Lee
(74) *Attorney, Agent, or Firm* — Carrier Blackman & Associates, P.C.; Joseph P Carrier; Anne G. Sabourin

(57) ABSTRACT

A strain sensor resistor includes: a resistive element (thin-film strain-resistive layer) formed nearly at the center of an upper surface of an insulation substrate to be a base; and front surface electrodes layered and formed on either end part of the resistive element and electrically connected to the resistive element. The entire upper part of the resistive element and a part of the front surface electrodes are covered by a protective film (protective coating). Moreover, back surface electrodes electrically connected to the front surface electrodes are formed on either lower end part of the insulation substrate, and end surface electrodes are formed on either longitudinal end surface of the insulation substrate. The strain sensor resistor has a tip shape solder mountable on a circuit board etc. using the back surface electrodes.

8 Claims, 4 Drawing Sheets

(56) References Cited

U.S. PATENT DOCUMENTS

| | | | | |
|---|---|---|---|---|
| 4,342,217 A * | 8/1982 | Paetow | ................ | G01L 1/2287 338/2 |
| 4,555,953 A * | 12/1985 | Dario | ................ | G01L 1/16 310/338 |
| 4,777,826 A * | 10/1988 | Rud, Jr. | ................ | G01L 1/2281 338/195 |
| 5,328,551 A * | 7/1994 | Kovacich | ................ | G01B 7/20 216/108 |
| 6,003,380 A * | 12/1999 | Sasaki | ................ | G01L 9/0055 73/720 |
| 8,421,311 B2 * | 4/2013 | Chuang | ................ | G01L 1/16 310/338 |
| 8,519,818 B2 * | 8/2013 | Chen | ................ | H01C 7/008 338/22 SD |
| 10,842,397 B2 * | 11/2020 | Liu | ................ | A61B 5/02444 |
| 2018/0113034 A1 * | 4/2018 | Inamori | ................ | H01C 1/16 |

FOREIGN PATENT DOCUMENTS

| | | |
|---|---|---|
| JP | 2002-157063 A | 5/2002 |
| JP | 2003-264101 A | 9/2003 |
| JP | 2009-130001 A | 6/2009 |
| JP | 2018-132531 A | 8/2018 |

* cited by examiner

STRAIN SENSOR RESISTOR

TECHNICAL FIELD

The present invention relates to a strain sensor resistor having a thin-film strain-sensitive resistive layer as a strain-sensing element.

BACKGROUND ART

A sensor called a strain gauge is used as a means of measuring stress on surfaces etc. of equipment and structures in various fields such as industrial equipment, transportation equipment, buildings, infrastructures, medical equipment, etc. A typical conventionally-used strain gauge is characteristic of having a film-like flexible structure, which is attached to a measuring object for use, as disclosed in Patent Document 1, for example.

That is, the conventional strain gauge has a structure made by attaching a metal foil meandering pattern onto a base material made of a thin electrical insulator, sandwiching them between organic laminated films, and attaching lead wires on either end of the meandering pattern. It is attached to a measuring object using a dedicated adhesive to measure strain.

Such conventional strain gauge has problems with its own form and adhering method, and some objects are thus difficult to measure strain. For example, while a pointing stick or type of pointing device for computers is an electronic device for detecting strain applied to a strain-resistive element on a printed wiring board, and moving a cursor on a computer screen, the conventional strain gauge is not applicable to electronic devices that utilize such strain measurement due to structural reasons etc.

Moreover, since downsizing of electronic devices mentioned above has progressed along with the downsizing of computers, the need for space-saving installation of sensor elements to be used that are also compact is rising. Accordingly, it is typical to form the strain-resistive element directly on a circuit board.

In Patent Document 2, for example, a carbon resistor is baked on a printed wiring board, forming a bridge circuit. Alternatively, in Patent Document 3, a thick-film resistive element is formed on a ceramic circuit board, thereby configuring a bridge circuit.

PRIOR ART DOCUMENTS

Patent Documents

Patent Document 1: JP 2018-132531A
Patent Document 2: JP 2001-236175A
Patent Document 3: JP 2002-157063A

DISCLOSURE OF THE INVENTION

Problems to be Solved by the Invention

The conventional strain gauge needs to be attached to a measuring object using an adhesive, as described above, and requires connecting lead wires to terminal portions, and thus has an unfit element form for application to small electronic devices such as a pointing stick. Moreover, the adhesive used for attaching to the measuring object has a problem that there is a possibility of providing insufficient adhesiveness due to the adhering method and compatibility with the adhering base material, therefore making it difficult to implement dependable and stable strain measurement.

The strain-resistive elements used for the pointing device are formed directly on a resin or ceramic plate. However, such direct formation will cause a problem that when failure of either one of the strain-resistive elements configuring the bridge occurs, the entire circuit needs to be rebuilt, which requires an additional cost.

Alternatively, Patent Document 2 discloses an example of forming strain-sensing elements directly on a printed circuit substrate, and then solder mounting other components required for the sensor. Since mounting of the strain-sensing elements and other electronic components is carried out in separate steps, the manufacturing steps are made more complicated, which is a problem.

In light of these problems, the present invention aims to provide a tip-shaped strain sensor resistor that can be solder mounted on a circuit board.

Means of Solving the Problems

The present invention aims to resolve the above problems, and includes the following structure, for example, as means for achieving the above aim. That is, a strain sensor resistor according to the present invention is characterized by including: an insulation substrate having a predetermined thickness, a predetermined bending strength, and an approximately rectangular form in a planar view; a thin-film strain-sensitive resistive layer formed nearly at the center of the front surface of the insulation substrate; a front surface electrode layer formed in either front end part of the insulation substrate and electrically connected to the thin-film strain-sensitive resistive layer; and a back surface electrode layer formed in either back end part of the insulation substrate and electrically connected to the front surface electrode layer. The resistor has a tip shape allowing solder mounting using the back surface electrode layer.

Alternatively, a strain sensor resistor according to the present invention is characterized by including: an insulation substrate having a predetermined thickness, a predetermined bending strength, and an approximately rectangular form in a planar view; a thin-film strain-sensitive resistive layer formed nearly at the center of the front surface of the insulation substrate; and a front surface electrode layer formed in either front end part of the insulation substrate and electrically connected to the thin-film strain-sensitive resistive layer. The resistor has a tip shape allowing solder mounting using the front surface electrode layer.

For example, it is characterized in that the predetermined thickness is 50 to 100 μm, and the predetermined bending strength is 800 to 1200 MPa. It is characterized in that, for example, the thin-film strain-sensitive resistive layer includes a resistive pattern extending in the longitudinal direction of the insulation substrate. It is further characterized in that, for example, the resistive pattern comprises a meandering pattern and a swelling pattern connected to the meandering pattern and having a form swelling out from the line width of the meandering pattern.

Results of the Invention

According to the present invention, since the strain sensor resistor can be mounted on a circuit board through soldering, a stable connection to the circuit board is secured, allowing stable strain measurement of a measuring object in a stress state.

DESCRIPTION OF EMBODIMENTS

Figure 1:
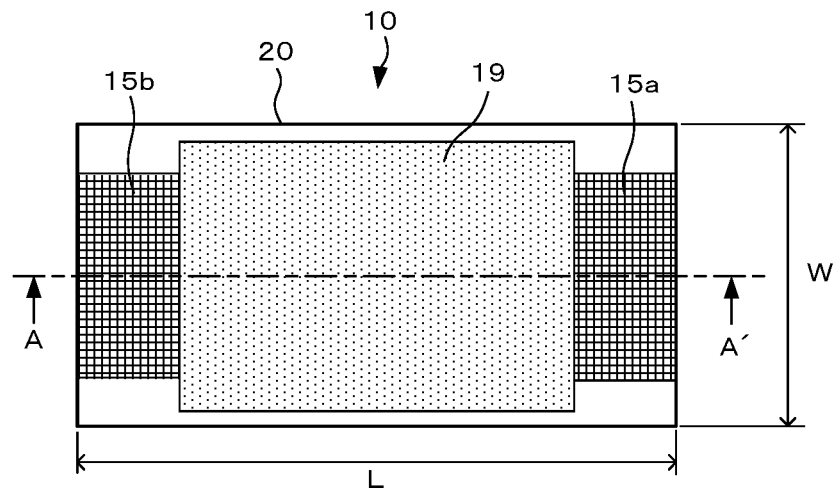
FIG. 1 is a top view of a strain sensor resistor according to an embodiment of the present invention.
Figure 2:
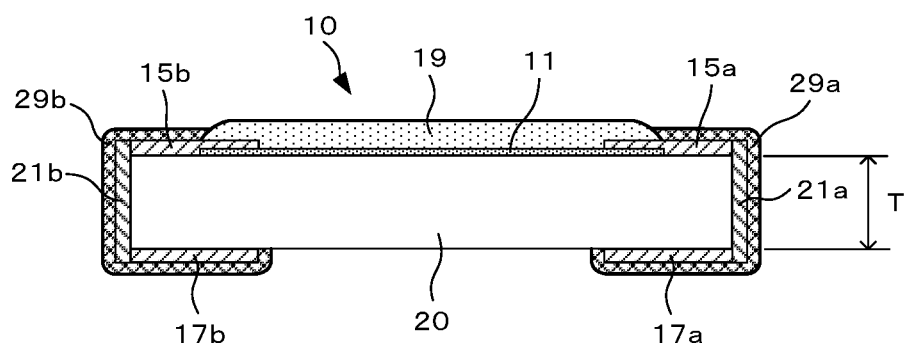
FIG. 2 is a cross-section of the strain sensor resistor according to the embodiment when cut along a line indicated by arrows A-A' of FIG. 1.

An embodiment according to the present invention is described in detail below with reference to accompanying drawings. FIG. 1 is a top view of a strain sensor resistor according to the embodiment. FIG. 2 is a cross-section of the strain sensor resistor when cut along a line indicated by arrows A-A' of FIG. 1.

A strain sensor resistor 10 according to the embodiment has a structure including: a resistive element (thin-film strain-resistive layer) 11 formed nearly at the center of an upper surface of an insulation substrate 20; front surface electrodes 15a and 15b layered and formed on either end part of the resistive element 11 and electrically connected to the resistive element; a protective film (protective coating) 19 that covers the entire upper part of the resistive element 11 and a part of the front surface electrodes 15a and 15b; back surface electrodes 17a and 17b formed on either end part of a lower side of the insulation substrate 20; and end surface electrodes 21a and 21b formed on either longitudinal end surface of the insulation substrate 20. Hereafter in the embodiment, while it is assumed that the strain sensor resistor 10 is mounted on a circuit board through soldering, it is not limited thereto. Mounting using wire bonding, a conductive adhesive, etc. may be selected appropriately.

The insulation substrate 20 is a rectangular (parallelepiped) insulative substrate made of alumina ($Al_2O_3$), zirconia ($ZrO_2$), etc., for example, having a thickness T of 50 to 100 μm. Moreover, bending strength of the insulation substrate 20 is 800 to 1200 MPa, for example. Therefore, the insulation substrate 20 has flexibility. Note that the back surface (opposite side to the surface in which the thin-film strain-resistive layer is formed) of the insulation substrate 20 may be bent or a groove may be formed to improve sensitivity as the strain gauge of the strain sensor resistor 10.

The strain sensor resistor 10 has a tip shape (surface mountable through soldering) having a longitudinal dimension L of 1.0 to 3.2 mm and a lateral dimension W of 0.5 to 1.6 mm, for example.

The strain sensor resistor 10 utilizes a principle that resistance changes as the resistive pattern expands and contracts due to added external force, and it is important for a strain sensor that the external force is equivalent as is to change in resistance in order to convert mechanical strain to electric quantity. Accordingly, the strain sensor resistor 10 has an overall tip shape, making it possible to solder the back surface electrodes 17a and 17b onto the substrate, thereby also stably fixing the strain sensor resistor 10 on the substrate, and allowing accurate measurement of strain according to change in external force applied on a resistive pattern.

Figure 3:
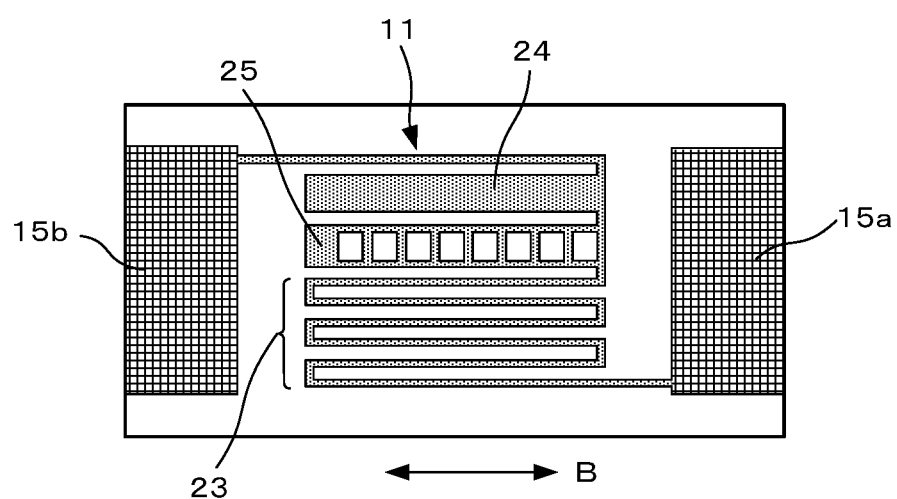
FIG. 3 illustrates an example of a resistance pattern of the strain sensor resistor according to the embodiment.

FIG. 3 illustrates an example of a resistance pattern of the resistive element 11. The resistive element 11 is a thin-film strain-sensitive resistive layer, and in order to improve sensitivity as a strain gauge, a pattern is formed so as to be perpendicular (parallel to the longitudinal direction indicated by reference B in FIG. 3) to the strain direction of the insulation substrate. The resistive element 11 is made from a meandering pattern 23, a swelling pattern 24, and a (resistance) rough adjustment pattern 25, which are connected in series.

The swelling pattern 24 is a resistive element having a form swelling from the line width of the meandering pattern. The rough adjustment pattern 25 swells from the line width of the meandering pattern, as with the swelling pattern 24, and the resistive elements at central portions thereof are removed in approximately rectangular shapes, making a looping pattern form. The swelling pattern 24 and the rough adjustment pattern 25 are connected to each other on respective base sides.

The meandering pattern 23 having a meandering form on the substrate has one end part connected to an end of the rough adjustment pattern 25, and the other end part connected to the front surface electrode 15a. Moreover, the swelling pattern 24 has one end part connected to the rough adjustment pattern 25, and the other end part connected to the front surface electrode 15b.

Note that while the conventional strain-sensing element has paired electrodes provided on one end side of the substrate, the strain sensor resistor 10 according to the embodiment has electrodes provided on either end of the insulation substrate 20, as illustrated in FIG. 1 etc. As a result, mountability on the circuit board etc. is improved, allowing an arrangement of the strain-sensing elements on lines of wiring on the circuit board, resulting in space-saving, and prevention of electrical shorts and creeping discharge between electrodes.

The insulation substrate 20 of the strain sensor resistor 10 according to the embodiment is thin, as described above, and is thus semitransparent. As a result, the resistive pattern of the resistive element 11 described above is transparent from the outside, even in a face-down mounted state. This produces merits that damage etc. of the resistive pattern can be visually confirmed with the strain sensor resistor 10 mounted on the circuit board etc., and an abnormal element may be specified while mounted and then exchanged. More specifically, confirmation of the resistive pattern is easy when a transparent resin is used for the protective film 19. In the embodiment, polyamide is used as the protective film 19.

Figure 5:
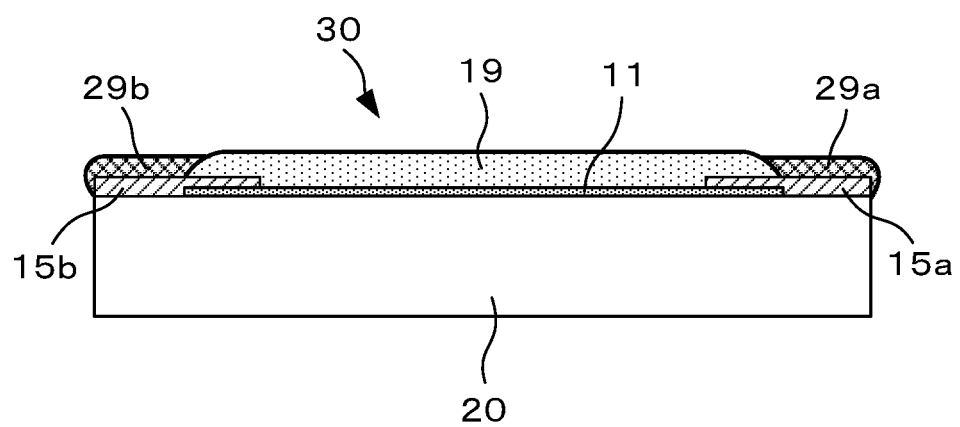
FIG. 5 illustrates a modified example of the strain sensor resistor according to the embodiment.

Other than the configuration according to the embodiment, it is possible to have a configuration made up of: the resistive element (thin-film strain-resistive layer) 11 formed at nearly the center of the upper surface of the insulation substrate 20 to be suitable for facedown mounting as with the strain sensor resistor 30 illustrated in FIG. 5; the front surface electrodes 15a and 15b layered and formed on either end part of the resistive element 11 and electrically connected to the resistive element; and the protective film (protective coating) 19 covering the entire upper part of the resistive element 11 and a part of the front surface electrodes 15a and 15b.

Alternatively, it may be configured having: resistive elements (thin-film strain-resistive layers) formed at nearly the center of either surface of the insulation substrate 20, front surface electrodes and back surface electrodes layered on either end part of the resistive element so as to be electrically connected, and protective films covering the entire upper part of the resistive elements and a part of the electrodes. Use of a configuration such that the front surface electrode and the back surface electrode are not electrically connected to each other in this case makes it ideal for application to a bridge circuit.

Figure 4:
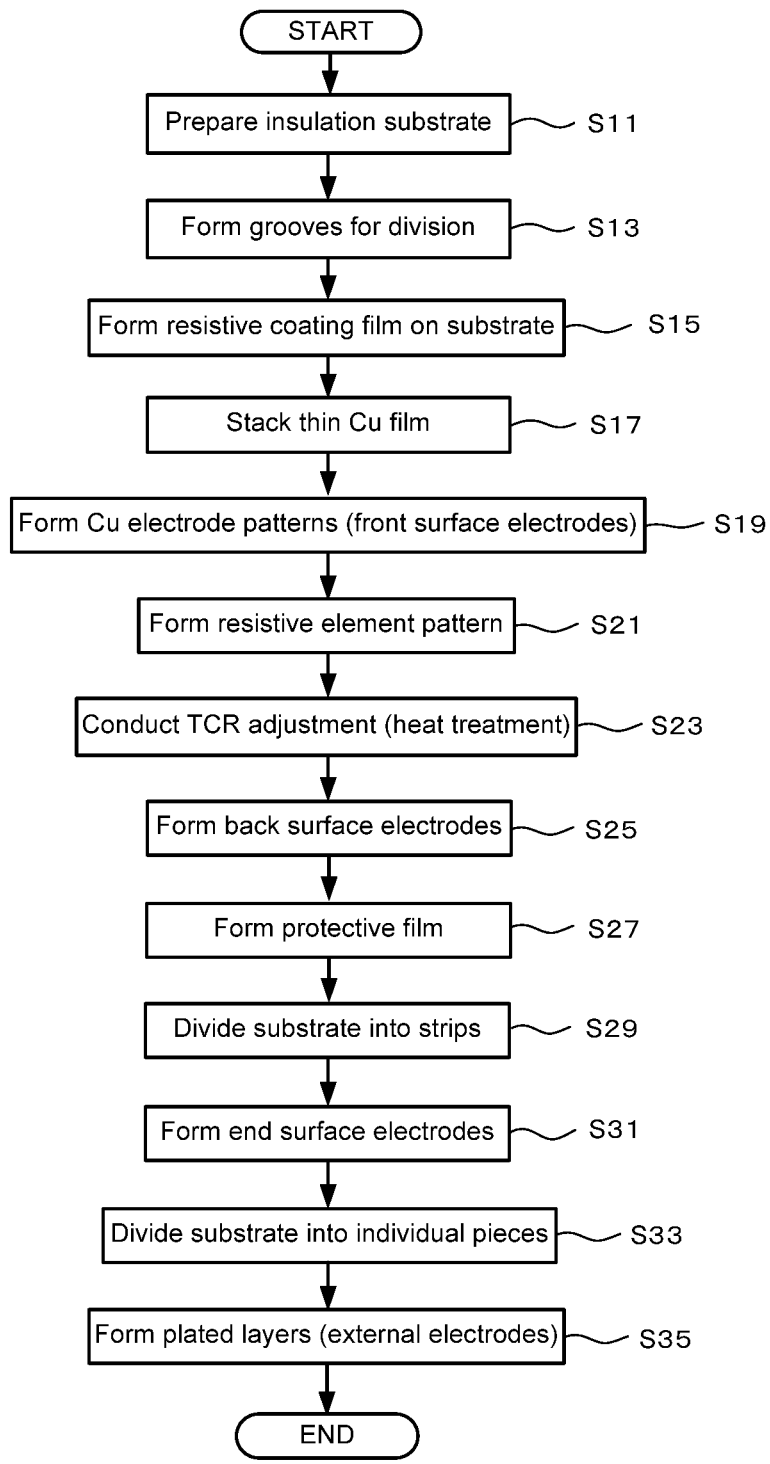
FIG. 4 is a flowchart showing manufacturing steps of the strain sensor resistor according to the embodiment in time series.

Next, manufacturing steps of the strain sensor resistor according to the embodiment are described. FIG. 4 is a flowchart showing the manufacturing steps of the strain sensor resistor according to the embodiment in time series. The insulation substrate described above is prepared in Step S11 of FIG. 4. Here, a large insulation substrate from which many divided pieces are taken is prepared. In subsequent Step S13, grooves for primary division are formed in one direction of the substrate as grooves for dividing the substrate in the front surface and the back surface or in either the front surface or the back surface of the insulation substrate, and grooves for secondary division are formed in an orthogonal direction to the one direction.

In Step S15, a coating film (thin-film strain-sensitive resistive layer) having a thickness of approximately 100 to 400 nm, for example, is formed to be a thin-film strain-resistive layer through sputtering and vapor deposition in each region of the front surface of the insulation substrate divided by the grooves for division described above. Here, NiCr, NiCrSi, NiCrAl or a Cr-type material is used as a material for the thin-film strain-resistive layer. In the case of using NiCr, NiCrSi, NiCrAl etc. as the material for the thin-film strain-sensitive resistive layer, properties of the strain sensor resistor are a gauge factor of 1.5 to 3.0, and TCR (−55° C. to 155° C.) of ±50 ppm/K. In the case of using a Cr-type material (CrO, CrN) as the material for the thin-film strain-sensitive resistive layer, properties of the strain sensor resistor are a gauge factor of 5.0 to 20, and TCR (20° C. to 50° C.) of ±100 ppm/K. The material for the thin-film strain-sensitive resistive element layer may be selected appropriately for desired properties.

In Step S17, for example, a 1-μm thick Cu film is layered on the resistive coating film described above through sputtering and vapor deposition. Then in Step S19, Cu electrode patterns (front surface electrodes 15a and 15b of FIG. 1 etc.) are formed through photolithography, for example. The front surface electrodes are formed on either longitudinal end part of the insulation substrate sandwiching the resistive coating film while partially overlapping it. This secures electrical connection between the resistive coating film and the front surface electrodes.

In Step S21, a resistive element pattern of the strain resistive element illustrated in FIG. 3 is formed through photolithography, for example. Then in Step 23, the temperature coefficient of resistance (TCR) of the thin film resistive element is adjusted through heat treatment.

The TCR is the gradient of change in electrical resistance due to temperature change, and while it differs according to the material (composition) of the resistive element, it also changes through heat treatment. Therefore, the heat treatment in Step S23 described above allows the TCR of the resistive element thin film as the strain-sensing element to be minimum and stable, resulting in decreased fluctuation in resistance values.

Note that in Step S21, in addition to heat treatment, for example, a notch (trimming groove) may be made in the resistive element pattern using a laser beam based on resistance value measured between front surface electrodes, so as to adjust the resistance value of the resistive element.

In Step S25, paired back surface electrodes (back surface electrodes 17a and 17b of FIG. 2) are formed on either lower end part of the insulation substrate. Here, a metal mask having a square-shaped opening, for example, is adhered to the back surface of the substrate, and a Cu electrode is formed through sputtering. In subsequent Step S27, resin (polyamide) is screen printed so as to cover the strain resistive element formed in Step S15 described above, thereby forming a protective film (protective coating) of the resistive element. Thickness of the protective film is 10 to 17 μm, for example.

In Step S29, the insulation substrate is divided into strips using the grooves for primary division provided in the insulation substrate as linear division markers through dicing, for example. In Step S31, the strips of substrate obtained through dividing are stacked and subjected to sputtering, for example, thereby forming end surface electrodes (end surface electrodes 21a and 21b of FIG. 2) made of a NiCr-type thin film, on one of fracture surfaces (either side part). Note that in the case of mounting the strain sensor resistor facedown, the end surface electrodes and the back surface electrodes described above do not need to be formed, as with the strain sensor resistor 30 illustrated in FIG. 5, for example.

In Step S33, the strips of substrate obtained through dividing on which the end surface electrodes are formed as described above are then divided along the grooves for secondary division provided in the insulation substrate, so as to divide the strain sensor resistor into individual pieces.

In Step S35, plated layers (plated layers 29a and 29b of FIG. 2, also referred to as external electrodes) made of nickel (Ni) and tin (Sn), for example, are formed so as to completely cover the end surface electrodes and the back surface electrodes and a part of the front surface electrodes. The plated layers may have a laminate structure resulting from applying a base plating using nickel etc., for example, and then solder plating (tin plating) etc. Thickness of the plated layers is 3 to 5 μm, for example.

Note that since thickness of the insulation substrate 20 is thin and the strain sensor resistor 10 is semi-transparent as described above, when dividing the insulation substrate into strips or individual pieces in the manufacturing steps described above, the resistive pattern can be visually confirmed even from the back side of the strain sensor resistor 10. Therefore, positioning marks etc. for division are unnecessary. Moreover, in the case where a defect generates in a specific region for forming the strain sensor resistor in the manufacturing steps, a defective one may be easily removed after division into individual pieces by marking the region from the back side, thereby improving productivity.

As described above, the strain sensor resistor given a tip shape allows mounting through soldering onto a circuit board, and a stable connection to the circuit board allows stable strain measurement. That is, since the strain sensor resistor is securely fixed to the circuit board through soldering, and thus the applied stress is directly reflected on the strain-resistive elements, responsiveness and reliability are drastically improved more than with the conventional configuration in which a sensor is attached using an adhesive and then used. As a result, the gauge factor, which is a change in resistance due to strain, may be increased.

Moreover, formation of the resistive pattern or thin-film strain-sensitive resistive layer running parallel to the longitudinal direction of the insulation substrate allows accurate measurement of change in resistive element cross-sectional area due to unidirectional tensile stress and compression as strain (change in stress).

Furthermore, since it may be independently mounted on the substrate from other components, removal of just a defective strain sensor resistor or one with a failure from the substrate is possible, thereby reducing costs as compared to exchanging the entire circuit.

On the other hand, since the form is solder mountable and easily incorporated onto the circuit board, it is mountable on the circuit board along with other electrical components. Therefore, mounting the strain sensor resistor before the other components or mounting afterwards is unnecessary, resulting in shorter manufacturing time and reduction in manufacturing cost of the mounting substrate.

Moreover, since it is a mounting type having external electrodes for soldering on either longitudinal end side, a signal lead wire extending from the electrode part provided on one end as with the conventional strain gauge is unnecessary, and it is applicable to various circuit patterns, thereby improving degree of freedom of mountability such as mounting place, mounting direction, etc.

Note that the strain sensor resistor of the present invention may be used as a fuse element, thin-film tip resistor, etc.

DESCRIPTION OF REFERENCES 10, 30: Strain sensor resistor
11: Resistive element (thin-film strain-resistive layer)
15a, 15b: Front surface electrode
17a, 17b: Back surface electrode
19: Protective film (protective coating)
20: Insulation substrate
21a, 21b: End surface electrode
23: Meandering pattern
24: Swelling pattern
25: Rough adjustment pattern
29a, 29b: Plated layer

The invention claimed is:

1. A strain sensor resistor, comprising:
an insulation substrate having a predetermined thickness, a predetermined bending strength, and an approximately rectangular form in a planar view;
a thin-film strain-sensitive resistive layer formed nearly at the center of a front surface of the insulation substrate;
a front surface electrode layer formed on either front end part of the insulation substrate and electrically connected to the thin-film strain-sensitive resistive layer; and
a back surface electrode layer formed separately from the front surface electrode, on either back end part of the insulation substrate and electrically connected to the front surface electrode layer via an end surface electrode layer formed on either longitudinal end surface of the insulation substrate; wherein
the strain sensor resistor has a surface-mountable shape allowing mounting with solder using the back surface electrode layer.

2. A strain sensor resistor, comprising:
an insulation substrate having a predetermined thickness, a predetermined bending strength, and an approximately rectangular form in a planar view;
a thin-film strain-sensitive resistive layer formed nearly at the center of a front surface of the insulation substrate; and
a front surface electrode layer layered and formed over the thin-film strain-sensitive resistive layer on either front end part of the insulation substrate and electrically connected to the thin-film strain-sensitive resistive layer; wherein
the strain sensor resistor has a surface-mountable shape allowing mounting with solder using the front surface electrode layer.

3. The strain sensor resistor according to claim 1, wherein the predetermined thickness is 50 to 100 μm, and the predetermined bending strength is 800 to 1200 MPa.

4. The strain sensor resistor according to claim 1, wherein the thin-film strain-sensitive resistive layer comprises a resistive pattern extending in the longitudinal direction of the insulation substrate.

5. The strain sensor resistor according to claim 4, wherein the resistive pattern comprises a meandering pattern and a swelling pattern connected to the meandering pattern and having a form swelling out from a line width of the meandering pattern.

6. The strain sensor resistor according to claim 2, wherein the predetermined thickness is 50 to 100 μm, and the predetermined bending strength is 800 to 1200 MPa.

7. The strain sensor resistor according to claim 2, wherein the thin-film strain-sensitive resistive layer comprises a resistive pattern extending in the longitudinal direction of the insulation substrate, where the resistive pattern is transparent from outside when the strain sensor resistor is in the face-down mounted state.

8. The strain sensor resistor according to claim 7, wherein the resistive pattern comprises a meandering pattern and a swelling pattern connected to the meandering pattern and having a form swelling out from a line width of the meandering pattern.

* * * * *